United States Patent [19]

Lasker

[11] 4,111,097
[45] Sep. 5, 1978

[54] ARMOR

[75] Inventor: George Lasker, Claremont, Calif.

[73] Assignee: General Dynamics Corporation, Pomona, Calif.

[21] Appl. No.: 518,688

[22] Filed: Oct. 29, 1974

[51] Int. Cl.² .............................. F41H 5/04
[52] U.S. Cl. .................... 89/36 A; 109/83; 428/256; 428/911
[58] Field of Search ............... 2/2.5; 89/36 R, 36 A; 109/49.5, 83; 428/251, 256, 911

[56] References Cited

U.S. PATENT DOCUMENTS

| 1,223,634 | 4/1917 | Steinmetz | 102/52 |
| 2,733,177 | 1/1956 | Meyer | 89/36 A |
| 2,758,952 | 8/1956 | Toulmin | 89/36 A |
| 3,604,374 | 9/1971 | Matson et al. | 89/36 A |
| 3,705,558 | 12/1972 | McDougal et al. | 89/36 A |
| 3,969,563 | 7/1976 | Hollis | 89/36 A |

Primary Examiner—Stephen C. Bentley
Attorney, Agent, or Firm—Albert J. Miller; Edward B. Johnson

[57] ABSTRACT

A laminated, multi-layer armor construction is disclosed as a means of defeating armor piercing projectiles.

5 Claims, 1 Drawing Figure

U.S. Patent  Sept. 5, 1978  4,111,097
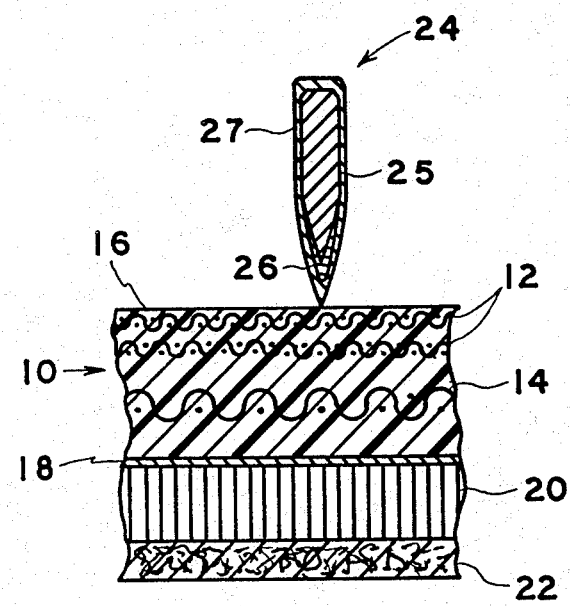

ARMOR

BACKGROUND OF THE INVENTION

Lightweight protective armor, suitable for use by personnel and aboard helicopters, has been generally ineffective against armor piercing projectiles and against multiple hits. The armor of the present invention will provide multiple hit protection from armor piercing bullets and yet be light enough in weight to be worn by an individual without undue hindrance.

Some examples of prior art patents are U.S. Pat. Nos. 2,758,952 and 3,577,836.

SUMMARY OF THE INVENTION

The present invention comprises a laminated, multi-layer armor having a fine wire mesh to generally strip the penetrating portion or core of the projectile, a strong wire mesh to create a pattern of cracks in the projectile core, and layers to absorb the remaining energy of the fragmented projectile core. The armor provides a method of defeating armor piercing projectiles such as the .30 AP M2 armor piercing bullet.

BRIEF DESCRIPTION OF THE DRAWING

The single FIGURE is a typical cross-sectional view of the laminated, multi-layer armor of the present invention.

DESCRIPTION OF THE PREFERRED EMBODIMENTS

As illustrated in the single FIGURE, the laminated, multi-layer armor 10 comprises five distinct layers of material. The first or exterior layer is one or more fine steel wire meshes 12. The second layer is a heavy tungsten wire mesh 14. Both the fine steel wire meshes 12 and the heavy tungsten wire mesh 14 are disposed in a porous foamed plastic mass 16 such as styrofoam.

A relatively thin steel plate 18 is the third layer of the armor 10, followed by the fourth layer, an aluminum honeycomb 20, and the fifth layer, a fiberglass plate 22. By way of example, the foam 16 would be approximately 1 inch thick with the tungsten wire 14 situated roughly halfway through the thickness thereof. The steel plate 18 would then be approximately 0.05 inches thick with the honeycomb one-half inch and the fiberglass roughly one-quarter inch.

While the armor 10 consists of five distinct layers of material, three functionally separate mechanisms are involved in stopping armor piercing projectiles such as the .30 AP M2 armor piercing bullet 24. This bullet 24 basically comprises a tool steel inner core 25 having a lead tip 26 both encased in a copper jacket 27.

First, the fine steel wire mesh or meshes 12 at least partially separates the lead tip 26 and copper jacket 27 from the steel core 25. Second, the tungsten wire mesh 14 completes the stripping of the steel core 25 and causes a pattern of cracks to form in the steel core 25. The high density, strength, and Young's modulus of tungsten wire will create sufficiently high contact pressures of impact with the core 25 to cause steel core fracture.

The last three layers, namely the steel plate 18, honeycomb 20, and fiberglass plate 22, will absorb the remaining energy of the fragmented bullet and wire particles.

The armor of the present invention provides ballistic efficiency comparable to existing ceramic armors but is lighter in weight and has a multiple hit capability. It is particularly useful as a personnel garment or as a shield in a helicopter.

While specific embodiments of the present invention have been illustrated and described, it is to be understood that these are provided by way of example only and that the scope of the invention is not to be limited thereto but only by the scope of the following claims.

What I claim is:

1. A laminated armor for protection against armor piercing projectiles comprising:
    means including at least one steel wire mesh to separate the projectile core from the remainder of the projectile;
    means including a tungsten wire mesh to fracture the projectile core; and
    means to absorb the remaining energy of the fractured projectile core.

2. The laminated armor of claim 1 wherein said projectile core separating means is spaced from the fracturing means.

3. The laminated armor of claim 2 wherein said projectile core separating means and said projectile core fracturing means are encased in a porous foamed plastic mass.

4. The laminated armor of claim 3 wherein said energy absorbing means include a steel plate, an aluminum honeycomb and a fiberglass plate sequentially disposed adjacent the porous foamed plastic mass encasing said steel wire mesh and said tungsten wire mesh.

5. A laminated armor for protection against a jacketed, tipped, steel cored bullet, comprising;
    a porous foamed plastic mass;
    at least one steel wire mesh encased in said porous foamed plastic mass at the outer periphery thereof to at least partially strip the jacket and tip from the bullet core;
    a tungsten wire mesh centrally encased in said porous foamed plastic mass to fracture the bullet core;
    a steel plate laminated to said porous foamed plastic mass at the periphery thereof opposite said steel wire mesh;
    an aluminum honeycomb laminated to the steel plate; and
    a fiberglass sheet laminated to said aluminum honeycomb, said steel plate, said aluminum honeycomb, and said fiberglass sheet to absorb the energy of the fractured bullet core.

* * * * *